(12) United States Patent
Lavoie

(10) Patent No.: US 10,150,506 B2
(45) Date of Patent: Dec. 11, 2018

(54) TRAILER BACKUP ASSIST INPUT WITH TWO-STAGE SPRING RATE

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 15/141,309

(22) Filed: Apr. 28, 2016

(65) Prior Publication Data
US 2017/0313351 A1 Nov. 2, 2017

(51) Int. Cl.
*B62D 13/06* (2006.01)

(52) U.S. Cl.
CPC .................................. *B62D 13/06* (2013.01)

(58) Field of Classification Search
CPC ...................................................... B62D 13/06
USPC ............................................................ 701/41
See application file for complete search history.

(56) References Cited

U.S. PATENT DOCUMENTS

| | | | |
|---|---|---|---|
| 3,944,972 A * | 3/1976 | Chandler | B60Q 9/002 340/286.02 |
| 4,320,267 A | 3/1982 | Greve et al. | |
| 4,518,044 A | 5/1985 | Wiegardt et al. | |
| 4,848,499 A | 7/1989 | Martinet et al. | |
| 4,947,097 A | 8/1990 | Tao | |
| 4,954,820 A * | 9/1990 | Kohno | A63H 30/04 340/12.5 |
| 5,261,495 A | 11/1993 | Szymczak | |
| 5,270,689 A | 12/1993 | Hermann | |
| 5,313,389 A | 5/1994 | Yasui | |
| 5,359,165 A | 10/1994 | Leveque et al. | |
| 5,430,261 A | 7/1995 | Malone | |
| 5,436,413 A | 7/1995 | Katakami | |
| 5,590,041 A * | 12/1996 | Cooper | B62D 11/183 180/6.2 |
| 5,957,232 A | 9/1999 | Shimizu et al. | |

(Continued)

FOREIGN PATENT DOCUMENTS

| | | |
|---|---|---|
| DE | 3923676 A1 | 1/1991 |
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Anne M Antonucci
*Assistant Examiner* — James E Stroud
(74) *Attorney, Agent, or Firm* — Frank MacKenzie; Price Heneveld LLP

(57) ABSTRACT

A steering input apparatus for a trailer backup assist system includes a control element moveable away from a center position sequentially through a first range and a second range of directional positions and biased toward the center position at a first rate through the first range and at a second, greater rate through the second range. The apparatus further includes a control module generating a vehicle steering command based on an instantaneous position of the control element.

20 Claims, 10 Drawing Sheets

(56) References Cited

U.S. PATENT DOCUMENTS

| | | | |
|---|---|---|---|
| 6,065,561 A * | 5/2000 | Howard | B62D 1/16 180/441 |
| 6,389,342 B1 | 5/2002 | Kanda | |
| 6,435,289 B1 * | 8/2002 | Hori | B62D 11/183 180/315 |
| 6,601,386 B1 | 8/2003 | Hori et al. | |
| 6,636,197 B1 | 10/2003 | Goldenberg et al. | |
| 6,750,406 B2 | 6/2004 | Komatsu et al. | |
| 7,038,667 B1 | 5/2006 | Vassallo et al. | |
| 7,085,634 B2 | 8/2006 | Endo et al. | |
| 7,191,865 B2 | 3/2007 | Spark | |
| 7,225,891 B2 | 6/2007 | Gehring et al. | |
| 7,255,061 B2 | 8/2007 | Denton | |
| 7,309,075 B2 | 12/2007 | Ramsey et al. | |
| 7,310,084 B2 | 12/2007 | Shitanaka et al. | |
| 7,315,299 B2 | 1/2008 | Sunda et al. | |
| 7,436,298 B2 | 10/2008 | Yuasa et al. | |
| 7,550,686 B2 | 6/2009 | Girke et al. | |
| 7,553,212 B2 * | 6/2009 | Yamaguchi | A63H 17/262 446/460 |
| 7,827,917 B1 | 11/2010 | Henderson | |
| 7,837,004 B2 | 11/2010 | Yasuda | |
| 7,857,085 B2 * | 12/2010 | Spark | B60T 8/24 180/236 |
| 8,036,792 B2 | 10/2011 | Dechamp | |
| 8,138,865 B2 | 3/2012 | North et al. | |
| 8,519,948 B2 | 8/2013 | Cruz-Hernandez et al. | |
| 8,755,984 B2 | 6/2014 | Rupp et al. | |
| 8,786,417 B2 | 7/2014 | Holmen et al. | |
| 8,798,860 B2 | 8/2014 | Dechamp | |
| 8,825,328 B2 | 9/2014 | Rupp et al. | |
| 8,909,426 B2 | 12/2014 | Rhode et al. | |
| 8,930,140 B2 | 1/2015 | Trombley et al. | |
| 8,972,109 B2 | 3/2015 | Lavoie et al. | |
| 9,033,284 B2 | 5/2015 | Van Staagen | |
| 9,102,271 B2 | 8/2015 | Trombley et al. | |
| 9,108,598 B2 | 8/2015 | Headley | |
| 9,132,856 B2 | 9/2015 | Shepard | |
| 9,164,955 B2 | 10/2015 | Lavoie et al. | |
| 9,187,124 B2 | 11/2015 | Trombley et al. | |
| 9,238,483 B2 | 1/2016 | Hafner et al. | |
| 9,248,858 B2 | 2/2016 | Lavoie et al. | |
| 9,315,212 B1 | 4/2016 | Kyrtsos et al. | |
| 9,321,483 B2 | 4/2016 | Headley | |
| 9,335,162 B2 | 5/2016 | Kyrtsos et al. | |
| 9,340,228 B2 | 5/2016 | Xu et al. | |
| 9,352,777 B2 | 5/2016 | Lavoie et al. | |
| 9,434,414 B2 | 9/2016 | Lavoie | |
| 2003/0214428 A1 * | 11/2003 | Tokita | A63H 30/04 341/176 |
| 2004/0093139 A1 | 5/2004 | Wildey et al. | |
| 2004/0189595 A1 | 9/2004 | Yuasa et al. | |
| 2005/0000738 A1 * | 1/2005 | Gehring | B62D 13/06 180/14.1 |
| 2005/0221717 A1 * | 10/2005 | Quinn | A63H 17/002 446/454 |
| 2006/0092129 A1 | 5/2006 | Choquet et al. | |
| 2007/0198190 A1 | 8/2007 | Bauer et al. | |
| 2008/0030361 A1 | 2/2008 | Peissner et al. | |
| 2008/0312792 A1 | 12/2008 | Dechamp | |
| 2009/0101429 A1 | 4/2009 | Williams | |
| 2009/0306854 A1 * | 12/2009 | Dechamp | B62D 13/06 701/41 |
| 2010/0063670 A1 | 3/2010 | Brzezinski et al. | |
| 2010/0152989 A1 | 6/2010 | Smith et al. | |
| 2010/0222964 A1 | 9/2010 | Dechamp | |
| 2011/0060488 A1 * | 3/2011 | Nakazawa | B66F 9/20 701/22 |
| 2011/0149077 A1 | 6/2011 | Robert | |
| 2011/0160956 A1 | 6/2011 | Chung et al. | |
| 2011/0275274 A1 * | 11/2011 | Dewitt | A63H 30/04 446/456 |
| 2012/0030626 A1 | 2/2012 | Hopkins et al. | |
| 2012/0087480 A1 | 4/2012 | Yang et al. | |
| 2012/0185131 A1 * | 7/2012 | Headley | B60D 1/245 701/41 |
| 2012/0271512 A1 | 10/2012 | Rupp et al. | |
| 2012/0271514 A1 | 10/2012 | Lavoie et al. | |
| 2012/0271515 A1 * | 10/2012 | Rhode | B62D 1/22 701/42 |
| 2012/0271522 A1 | 10/2012 | Rupp et al. | |
| 2013/0006472 A1 | 1/2013 | McClain et al. | |
| 2013/0024064 A1 | 1/2013 | Shepard | |
| 2013/0158803 A1 | 6/2013 | Headley | |
| 2013/0158863 A1 | 6/2013 | Skvarce et al. | |
| 2013/0193263 A1 * | 8/2013 | Schweighart | B60F 5/02 244/2 |
| 2013/0268160 A1 | 10/2013 | Trombley et al. | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0088797 A1 | 3/2014 | McClain et al. | |
| 2014/0156148 A1 | 6/2014 | Kikuchi | |
| 2014/0160276 A1 | 6/2014 | Pliefke et al. | |
| 2014/0172232 A1 * | 6/2014 | Rupp | B60W 30/18036 701/36 |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 * | 10/2014 | Lavoie | B62D 15/0275 701/41 |
| 2014/0309888 A1 | 10/2014 | Smit et al. | |
| 2014/0324295 A1 | 10/2014 | Lavoie | |
| 2014/0343795 A1 * | 11/2014 | Lavoie | B62D 13/06 701/42 |
| 2014/0379217 A1 | 12/2014 | Rupp et al. | |
| 2015/0057903 A1 | 2/2015 | Rhode et al. | |
| 2015/0066296 A1 | 3/2015 | Trombley et al. | |
| 2015/0070161 A1 | 3/2015 | Mizuno et al. | |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1 | 6/2015 | Hafner et al. | |
| 2015/0203156 A1 * | 7/2015 | Hafner | B62D 13/06 701/36 |
| 2015/0210317 A1 | 7/2015 | Hafner et al. | |
| 2015/0217693 A1 | 8/2015 | Pliefke et al. | |
| 2015/0307129 A1 * | 10/2015 | Headley | B60D 1/245 701/41 |
| 2016/0039456 A1 | 2/2016 | Lavoie et al. | |
| 2016/0059888 A1 | 3/2016 | Bradley et al. | |
| 2016/0059889 A1 | 3/2016 | Herzog et al. | |
| 2016/0096549 A1 | 4/2016 | Herzog et al. | |
| 2016/0129939 A1 | 5/2016 | Singh et al. | |
| 2016/0229452 A1 * | 8/2016 | Lavoie | B62D 15/027 |
| 2016/0236711 A1 * | 8/2016 | Yang | B62D 13/00 |
| 2016/0280267 A1 | 9/2016 | Lavoie et al. | |
| 2016/0304122 A1 | 10/2016 | Herzog et al. | |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |

(56) References Cited

FOREIGN PATENT DOCUMENTS

| | | | |
|---|---|---|---|
| EP | 0418653 | A1 | 3/1991 |
| EP | 1653490 | A1 | 5/2006 |
| EP | 1810913 | A1 | 7/2007 |
| EP | 2388180 | A2 | 11/2011 |
| EP | 1569073 | B1 | 9/2014 |
| GB | 2398048 | A | 8/2004 |
| GB | 2398049 | A | 8/2004 |
| GB | 2398050 | A | 8/2004 |
| JP | 2003045269 | A | 2/2003 |
| JP | 2003175852 | A | 6/2003 |
| JP | 2007186118 | A | 7/2007 |
| KR | 20140105199 | A | 9/2014 |
| WO | 0044605 | A1 | 8/2000 |

\* cited by examiner

FIG. 10A   FIG. 10B

TRAILER BACKUP ASSIST INPUT WITH TWO-STAGE SPRING RATE

FIELD OF THE INVENTION

The present invention generally relates to steering assist technologies in vehicles and, more particularly, to trailer backup assist system having a rotatable driver interface for controlling a radius of curvature for a trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

According to one aspect of the present disclosure, a steering input apparatus for a trailer backup assist system includes a control element moveable away from a center position sequentially through a first range and a second range of directional positions and biased toward the center position at a first rate through the first range and at a second, greater rate through the second range. The apparatus further includes a control module generating a vehicle steering command based on an instantaneous position of the control element.

According to another aspect of the present disclosure, a backup assist system for a vehicle reversing a trailer includes a control knob rotatable away from a center position sequentially through a first range and a second range of directional positions biased toward the center position at a first rate through the first range and at a second, greater rate through the second range. The system further includes a control module generating a vehicle steering command based on an instantaneous position of the control knob.

According to another aspect of the present disclosure, a method for assisting in reversing a vehicle-trailer combination. The method includes determining a range of steerable curvature commands for the vehicle-trailer combination and estimating a range of recovery distances corresponding with the range of steerable curvature commands. The method further includes separating the range of recovery distances respectively into first and second sub-ranges below and above a recovery distance threshold and respectively allocating the first and second sub-ranges to first and second ranges of sequential movement of a control element.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
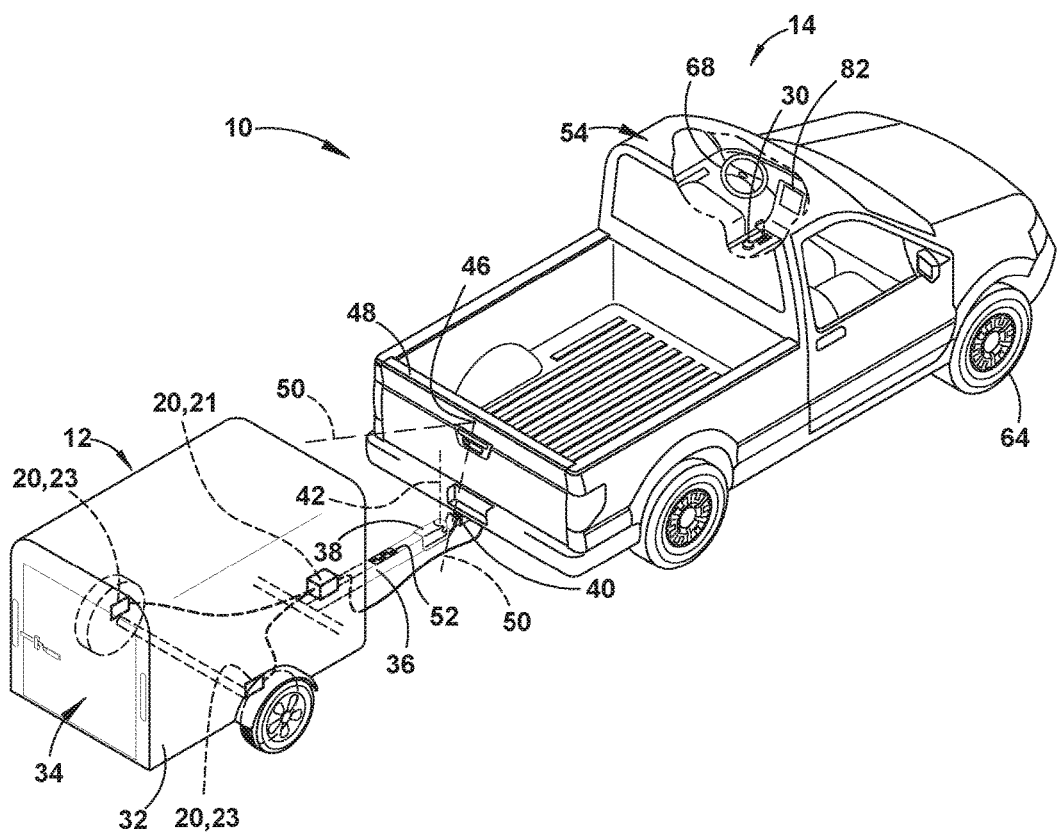
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimates a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable, or otherwise moveable, knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
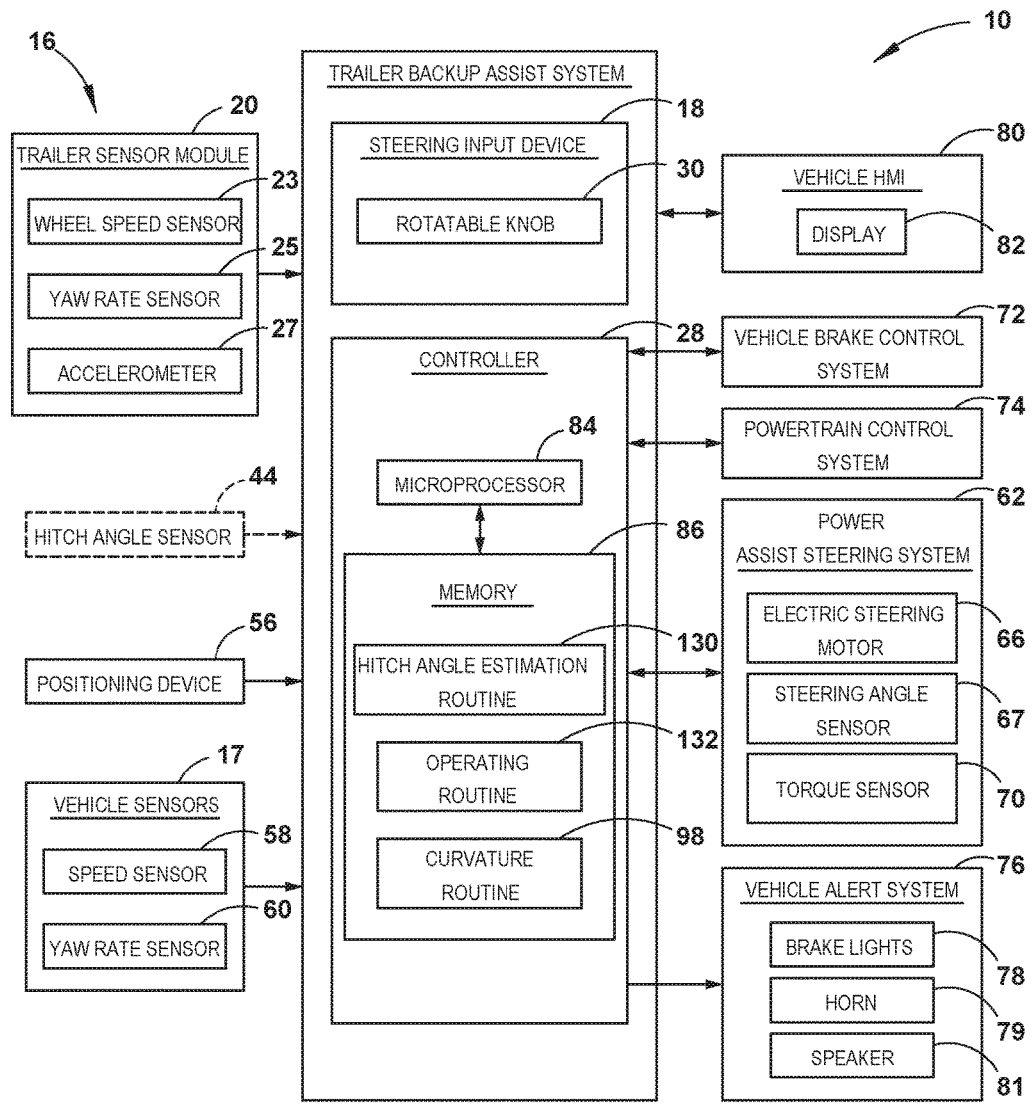
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
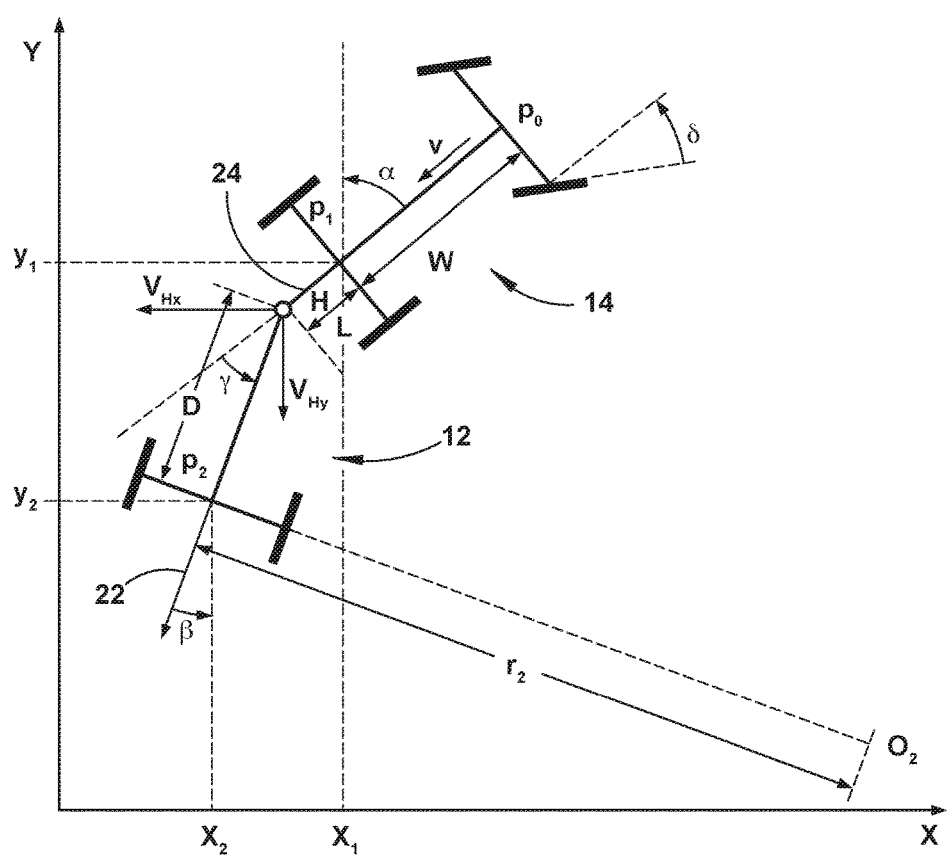
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
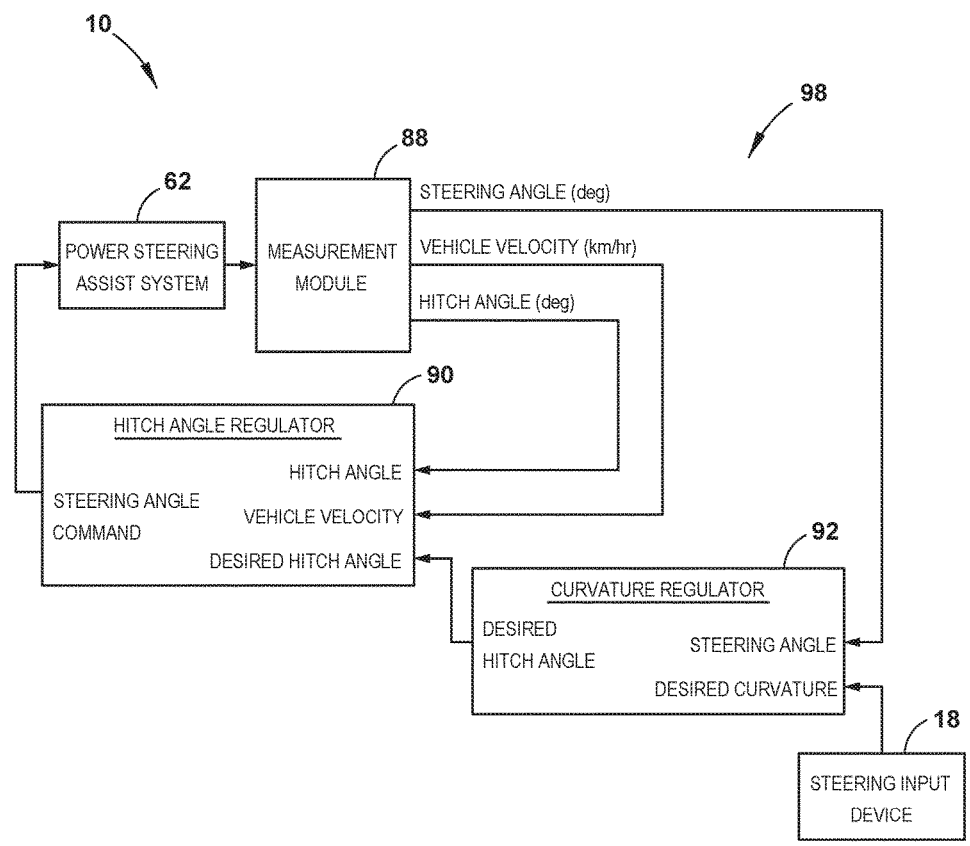
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\overline{\delta}$$

$$\tan(\delta) = \overline{\delta} = \frac{W}{v(t)\left(1 + \frac{L}{D}\cos(\gamma(t))\right)}\left(K_p(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Figure 5:
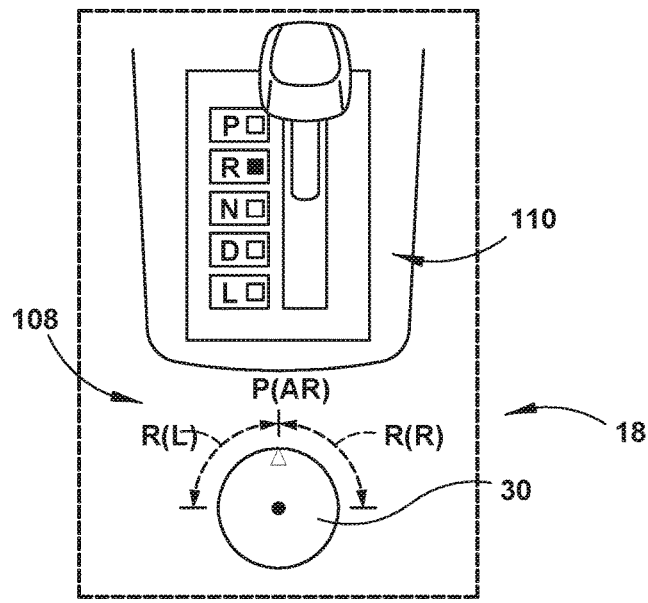
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
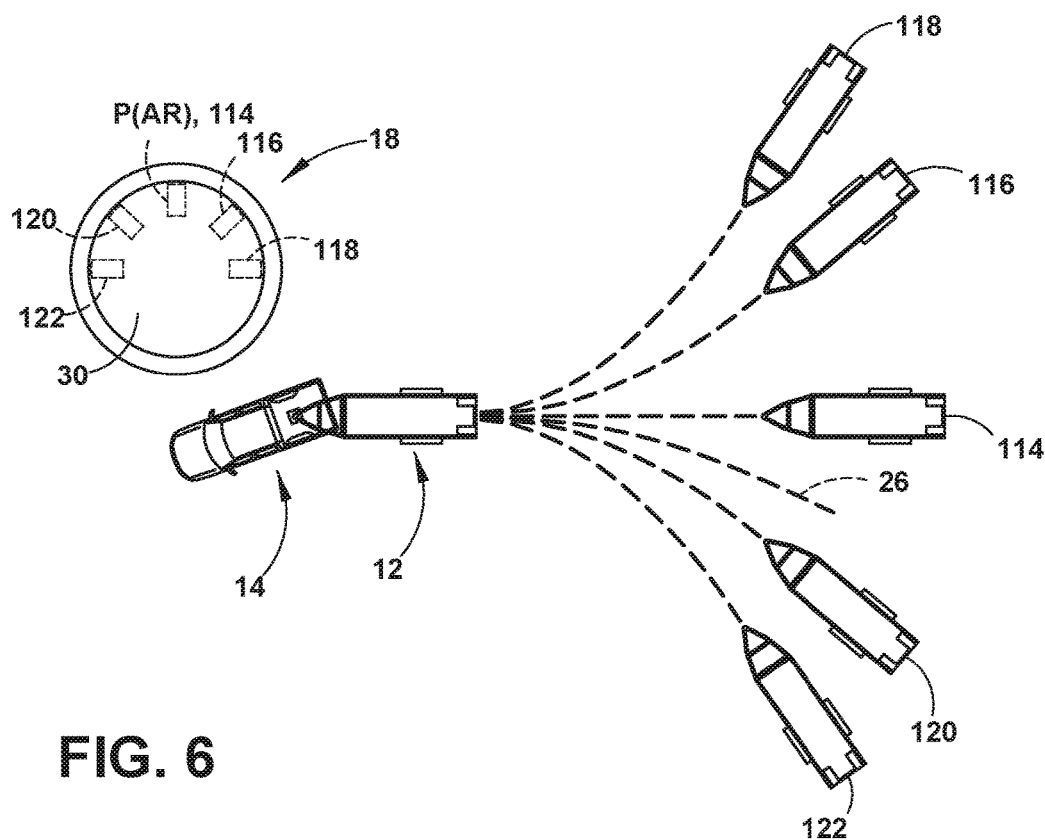
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 114 (FIG. 6) zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26, within the available ranges of directional positions, while the driver of the vehicle 14 backs the trailer 12. In the illustrated embodiment, the rotatable knob 30 rotates about a central axis between a center or middle position 114 corresponding to a substantially straight backing path 26 of travel (i.e. zero curvature), as defined by the longitudinal direction 22 of the trailer 12, and various rotated positions 116, 118, 120, 122 on opposing sides of the middle position 114, commanding a desired curvature 26 (which may be referred to as the "curvature command") corresponding to a radius of desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
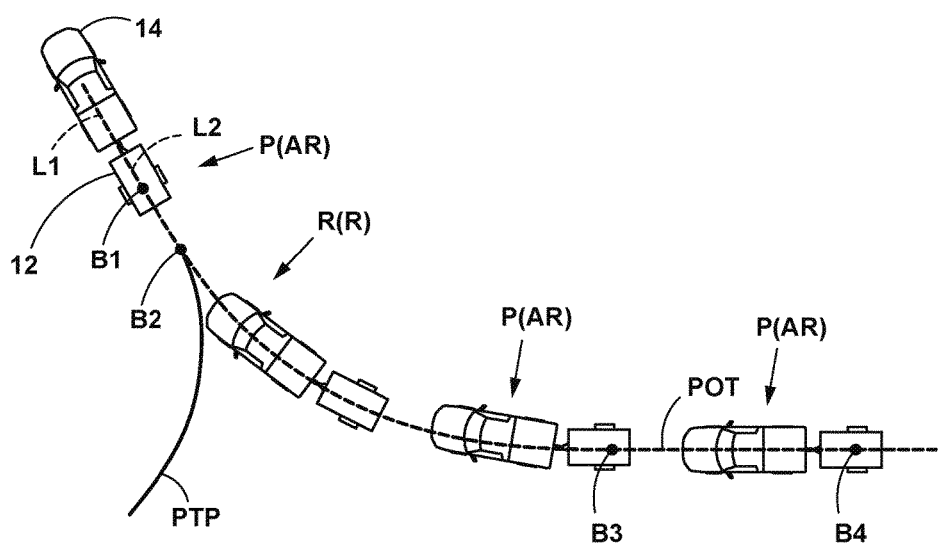
FIG. 7 is a schematic diagram showing a backup sequence of a vehicle and a trailer implementing various sequential curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 230 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
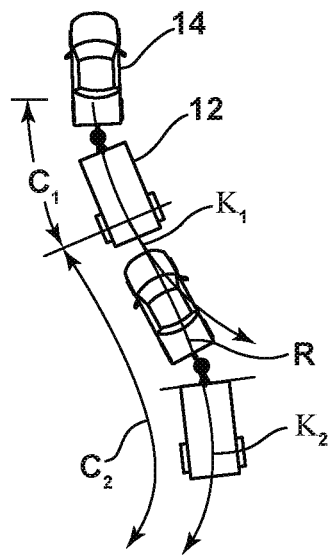
FIG. 8 is a schematic view showing a vehicle backing a trailer along a path including multiple curvatures with a recovery period therebetween.

Referring now to FIG. 8, a schematic view of a vehicle 14 reversing a trailer 12 is shown during a sequence of backing maneuvers implemented using a particular implementation of the steering input device 18, including a rotatable knob 30, as described above. In this sequence, it is shown that upon initially reversing under a particular curvature command $C_1$ that corresponds with a curvature $\kappa_1$ of the combined trailer 12 and vehicle 14 (as implemented by system 10 by controlling the steering angle $\delta$ of the wheels 64 of vehicle 14, as described above), the combined trailer 12 and vehicle 14 will go through a recovery path R of a certain distance after a second curvature command $C_2$ is entered by the driver using knob 30. As shown, even when the subsequent curvature command $C_2$ is in a direction opposite the initial command $C_1$, a portion of the recovery path R will continue in the direction of $C_1$ as the path R transitions from the initially-commanded curvature $\kappa_1$ to reach the second commanded curvature $\kappa_2$. Overall, the distance needed for the combined trailer 12 and vehicle 14 combination to achieve the second commanded curvature $\kappa_2$ represents a lag between the driver imputing the second curvature command $C_2$ and the corresponding curvature $\kappa_2$ being reached.

Figure 9:
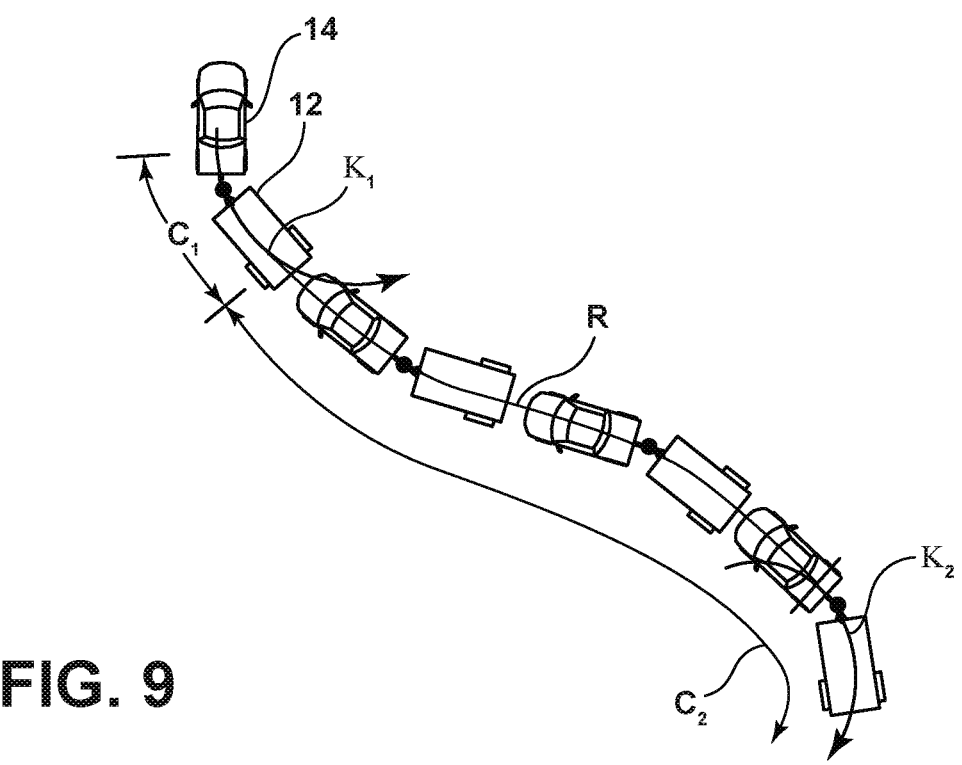
FIG. 9 is a further schematic view showing a vehicle backing a trailer along an alternative path including multiple curvatures with an extended recovery period therebetween.
Figure 10:
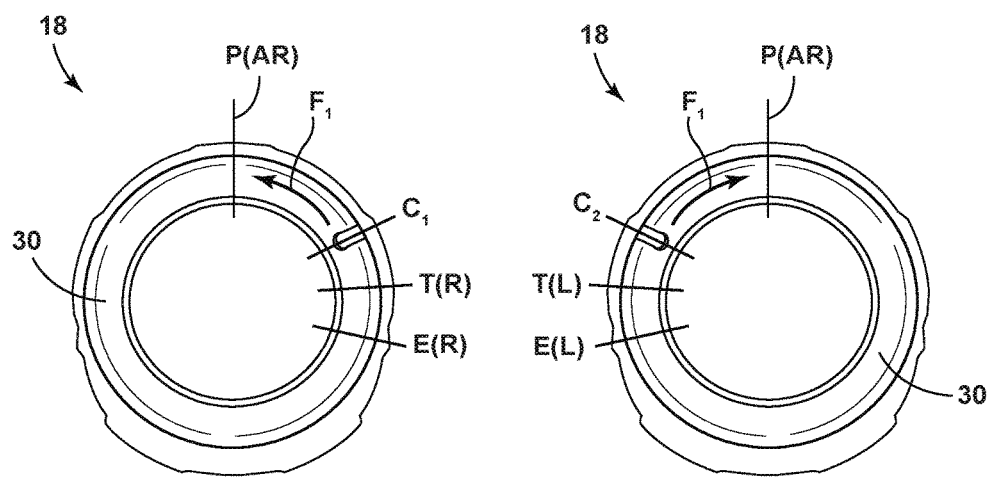
FIGS. 10A and 10B show a variation of the rotatable knob of FIGS. 5 and 6 during a control sequence of the vehicle and trailer combination of FIG. 8 along the depicted path.

As further shown in FIG. 9, when the initially-commanded curvature $\kappa_1$, corresponding to the initial curvature command $C_1$, is relatively tight (i.e. such that a high hitch angle $\gamma$ is maintained), a relatively longer recovery path R is traversed after entering a second curvature command $C_2$ in a direction opposite the first curvature command $C_1$, a significant portion of which may be in the direction of the first curvature command $C_1$. This effect is generally even more pronounced as trailer length D increases, with relatively longer trailers traversing a relatively long recovery path R (such as at least three lengths of vehicle 14). This can become a problem if the driver needs to change the direction of the trailer multiple times within a limited amount of lateral space relative to the vehicle staring point or commands an initial curvature $\kappa_1$ without enough overall room to recover without requiring that vehicle 14 be driven forward.

To potentially help a driver avoid situations where there is inadequate room to recover from a commanded curvature, without restricting system 10 from allowing relatively tighter curvatures to be commanded, where adequate recovery space is needed, system 10 may include a variation of knob 30 in a steering input device 18 similar to that which is described above with respect to FIGS. 5-7. In particular, knob 30, may include a dual-rate biasing scheme in which knob 30 is biased toward the at-rest position P(AR), as described above, at a first rate within a first range, extending immediately from the at-rest position P(AR) to threshold T(R),T(E), at which point the rate will increase within a second range from the threshold T(R),T(E) to respective endpoints E(R),E(L) of the rotation of knob 30. In this manner, system 10 can be calibrated to utilize knob 30 such that curvatures within a range requiring a recovery path having an overall length below a predetermined threshold can be commanded by rotation of knob 30 within the lower range (the at-rest position P(AR) to the threshold T(R),T(L)). Further curvatures within a range requiring a recovery path having an overall length above the predetermined threshold are commanded by rotation of knob 30 within the higher range (the threshold T(R),T(L) to the corresponding endpoint E(R),E(L). By this scheme, knob 30 provides the user with a tactile/haptic notification that a curvature is being requested that will require a longer distance for turn recovery. This can allow the user to evaluate the surroundings of vehicle 14 and trailer 12 to assess if the surroundings allow for such recovery before proceeding.

As discussed above, and as can be understood based on the above description of the kinematic model underlying curvature routine 98, trailers 12 with a greater length D have comparatively greater recovery periods, which may be measured in time (recovery time) or distance (recovery distance) for similar curvatures. Accordingly, in one embodiment, controller 28 can generally determine a maximum degree of steady-state curvature that a vehicle 14 and trailer 12 combination can maintain, given a particular length D of the particular trailer 12 coupled with vehicle 14 (given that other characteristics of vehicle 14, including the maximum steering angle δ, wheelbase W, drawbar length L, etc., are known and unchanging with respect to the particular vehicle 14 in which system 10 is included). In other words, controller 28 can determine a maximum curvature κ that corresponds with a steady-state maneuver of the vehicle 14 and trailer 12 combination at a maximum controllable hitch angle $\gamma_{max}$ at a low vehicle speed. Controller 28 can then derive a range of curvature, from zero (i.e. straight backing) to the determined maximum and assign this range to the range of movement, which is rotation between the at-rest position P(AR) and the end points of rotation E(R) and E(L) in the instance of the steering input device 18 with rotary knob 30 shown in the figures. Similar assignment can be made with respect to a joystick, a slider, or the like, which may be used to control a vehicle 14 and trailer 12 combination in a manner similar to that which is described herein. In a similar manner, a variation of knob 30 with capability to actively adjust the range of rotation thereof can adjust the endpoints of rotation of knob 30 based on a determination of the maximum degree of curvature in such conditions. Such a knob 30 can be similar to that which is described in co-pending, commonly-assigned U.S. patent application Ser. No. 14/878,227, the entire disclosure of which is incorporated by reference herein.

By assigning a set range of rotation, such as that which is employed by knob 30 as presently described, in a linear manner, the above-described rotational thresholds T(R),T(L) will correspond proportionately to a particular curvature amount, above which additional effort will be needed to turn knob 30. Accordingly, the location of the threshold location T(R),T(L) can be positioned with respect to the overall range of rotation to correspond with a consistent proportion of the overall curvature determined by controller 28 for which the above-described indication of an extended recovery path will be needed. This proportion can vary according to various considerations, including the overall responsiveness of system 10 and the length of recovery for which an indication is desired. In one embodiment, the threshold T(R),T(L) can be located at about 75% of the total rotation range from the at-rest position P(AR) to the corresponding endpoint E(R),E(L). In other embodiments, the threshold T(R),T(L) can be located at about 80%, 85%, or more, of the total rotation range from the at-rest position P(AR) to the corresponding endpoint E(R),E(L).

As such, regardless of the amount of curvature permitted by controller 28 to maintain the hitch angle γ below the maximum controllable hitch angle $\gamma_{max}$, knob 30 will provide a haptic indication of an increased curvature recovery distance through a consistent proportion of the available curvature. Because, generally speaking, system 10 will permit a lower degree of curvature for longer trailers, while permitting a higher degree of curvature for shorter trailers, and because longer trailers have longer recovery distances for comparatively similar curvatures, the proportion of curvature available above the threshold T(R),T(L) will generally correspond to comparable recovery lengths among different trailer lengths. In various embodiments, the above-described locations for threshold T(R),T(L) can correspond to a recovery length of about three lengths of vehicle 14 (+/−one-half of a length of vehicle 14), for example. In various embodiments, controller 28 can determine the proportionality of the mapping of available curvature to the range of motion for knob 30 according to various factors, including trailer length D, drawbar length L, and others. In an example, controller 28 may employ a lookup table proving appropriate mapping characteristics based on such measurements. In a further example where drawbar length L is known and/or the only factor considered is trailer length D, such a lookup table can include mapping data dependent on the trailer length D, or controller 28 can utilize an equation mapping the available knob range to trailer length D. As an alternative a variation of the above-referenced adaptable knob can also adjust the positioning of threshold T(R),T(L) according to a calculated recovery length threshold so as to be potentially more consistent among various trailer lengths D.

In an embodiment, the referenced rate of biasing of knob 30 to the at-rest position can be a linear spring force rate of increase, wherein the force at which knob 30 is biased toward the at-rest position P(AR) increases linearly (or near-linearly) with the distance of movement away from the at-rest position P(AR) by a spring constant. In such an embodiment, the rate is the spring constant, and in the instance of the rotatable knob 30, described herein, the force is applied in a rotational manner as a biasing torque about the center of knob 30, although other arrangements are possible. Accordingly, in the illustrated embodiment, the rate of biasing is a linear increase, within the particular portions of the rotational range of knob 30 (i.e. respectively above and below threshold T(R),T(L)), in the torque needed to further rotate knob 30. This rate is greater, resulting in such torque increasing more with further rotation of knob 30, above threshold T(R),T(L). In one embodiment, the spring constant (and accordingly, the rate of increase in biasing torque) may be 30% greater above threshold T(R), T(L) than below it. In other embodiments, the spring constant may be 40%, 50%, 100% (i.e. twice the rate below threshold T(R),T(L)) or greater above threshold T(R),T(L). In general, the increase in the spring constant above threshold T(R),T(L) is selected to achieve a desire degree of perceptibility of such increase.

The increase in spring constant above threshold T(R),T(L) can be achieved by including a first spring (or corresponding pair of springs for each direction of rotation, left and right) that are coupled with knob 30 through the entire range of rotation thereof, along with a second spring (or corresponding pair of springs) that engage with knob from the threshold T(R),T(L) to the respective ends of rotation E(R),E(L). Such springs can be spiral springs with appropriate catches or clutch mechanisms, as needed, to cause engagement thereof with knob 30 at the appropriate rotational positions. Alternatively, such springs can be linear springs (i.e. coil springs or the like) coupled with knob 30 by gears and variations of the above-mentioned catches or clutches. As such, the spring constants of the two springs will work in aggregate once both are engaged with knob, to increase the overall spring constant by that of the second spring. Either type of spring can work by tension or compression, as desired. In a variation, either type of spring used to increase the biasing rate can be pre-tensioned or pre-extended, as applicable, to provide an instant increase in the biasing torque of knob 30 toward the at-rest position P(AR) at the threshold T(R),T(L), followed by an increase in such torque by the higher, aggregate rate. Still further, an adaptive variation of knob 30 can vary the torque by controlling an associated motor to simulate such an increase in rate according to either such scheme.

As shown in FIG. 8, along with FIGS. 10A and 10B, a backing path of vehicle 14 reversing a trailer 12 can be achieved by implementing successive curvature commands $C_1$ (FIG. 10A) and $C_2$ (FIG. 10B) using knob 30. As a result, the portion of the backing path illustrated in FIG. 8 can include a first portion at which a first curvature $\kappa_1$ is realized, followed by a recovery portion R where system 10 works to achieve a second curvature K2 corresponding to the second curvature command $C_2$. Such curvature $\kappa_2$ is achieved after a distance of the recovery portion R. As illustrated, the recovery path following the first curvature command $C_1$ is relatively short, i.e., less than three vehicle lengths. Accordingly, the rotational positioning of the knob 30 in calling for the first curvature command $C_1$ is below threshold T(R). In a similar manner, the second curvature command $C_2$ is also below threshold T(R), indicating that a similarly-short recovery path will follow backing of trailer 12 along the corresponding second curvature $\kappa_2$, once achieved.

Figure 11:
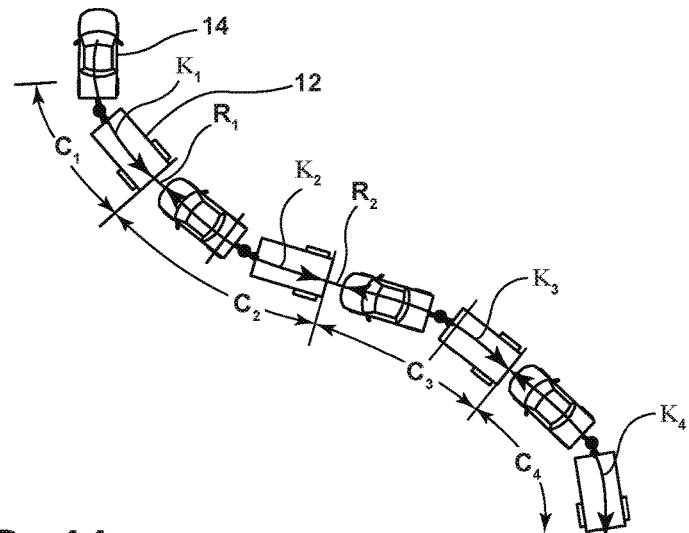
FIG. 11 is a further schematic view showing a vehicle backing a trailer along an alternative path including multiple curvatures with an extended recovery period therebetween.
Figure 12A:
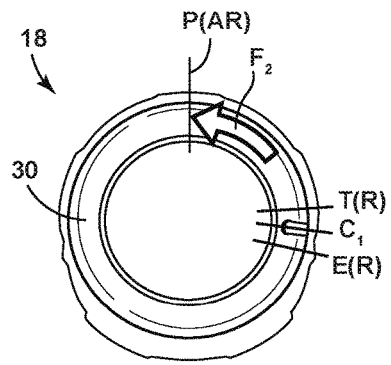
FIGS. 12A-12D show the rotatable knob of FIGS. 10A and 10B during a control sequence of the vehicle and trailer combination of FIG. 11 along the depicted path.
Figure 12B:
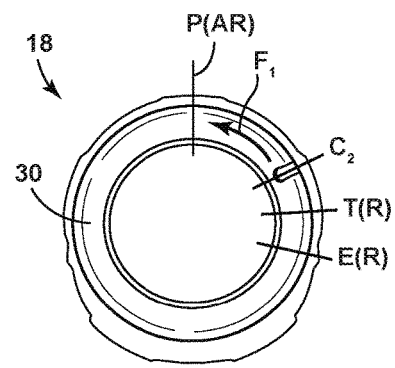

Turning to FIG. 11, along with FIGS. 12A-12D, a different backing path for vehicle 14, reversing trailer 12 is shown that is achieved by implementing successive curvature commands $C_1$ (FIG. 12A), $C_2$ (FIG. 12B), $C_3$ (FIG. 12C), and $C_4$ (FIG. 12D) using knob 30. The resulting backing path, illustrated in FIG. 11, includes a first portion at which the first curvature $\kappa_1$ is realized. As can be seen in FIG. 12A, the use of knob 30 to command curvature $C_1$ is beyond threshold T(R), meaning that the curvature $\kappa_1$ realized requires a length of a recovery path associated therewith that is over the predetermined threshold (e.g., three lengths of vehicle 14), an indication of which is provided by the biasing torque rate on knob 30 of $F_2$ (which as seen below is greater than if the knob 30 position is below threshold T(R)). As further shown in FIGS. 11 and 12B, the second curvature command $C_2$ is in the same direction as the first command $C_1$ and corresponds with a curvature $\kappa_2$ that is below the predetermined threshold. As a result, the position of knob 30 (FIG. 12B) in commanding curvature $\kappa_2$ is below threshold T(R) and a reduced biasing torque rate $F_1$ is applied on knob 30. As further shown in FIG. 11, the backing path includes a recovery period $R_1$ over which the path reduces in curvature from $\kappa_1$ to $\kappa_2$. Accordingly, although a change in direction is not called for between the first curvature command $C_1$ and the second curvature command $C_2$, the driver of vehicle 14 may still benefit from the increased torque rate $F_2$ in knowing that a somewhat longer recovery length $R_1$ is needed even in reducing the curvature from the initial curvature $\kappa_1$.

Figure 12C:
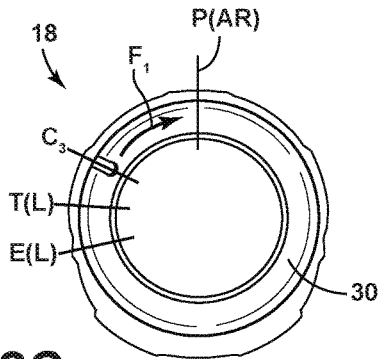
Figure 12D:
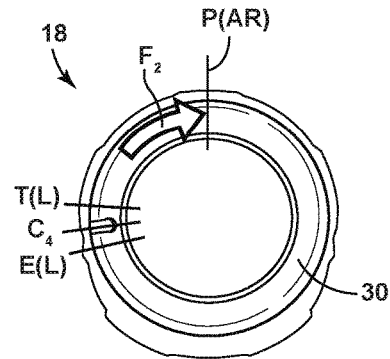

Continuing with reference to FIG. 12C, command $C_3$ calls for a change in direction from curvature $\kappa_2$, resulting in a second recovery period $R_2$ for the curvature to reach the commanded curvature $\kappa_3$ corresponding to that of the curvature command $C_3$. As shown, the third curvature command $C_3$ corresponds with curvature $\kappa_3$ that is also below the predetermined threshold. As a result, the position of knob 30 (FIG. 12C) used in commanding curvature $\kappa_3$ is below threshold T(L) and the lower biasing torque rate $F_1$ is applied on knob 30. Subsequently, a fourth curvature command $C_4$ can be entered (FIG. 12D) that calls for an increased curvature $\kappa_4$ in the same direction as curvature $\kappa_3$. As shown, the curvature command $C_4$ is beyond threshold T(L), resulting in the biasing torque being applied to knob 30 at increased rate $F_2$ to indicate an increased distance of any subsequent recovery period, which may be similar to that shown in FIG. 9, and discussed above with respect thereto.

Figure 13:
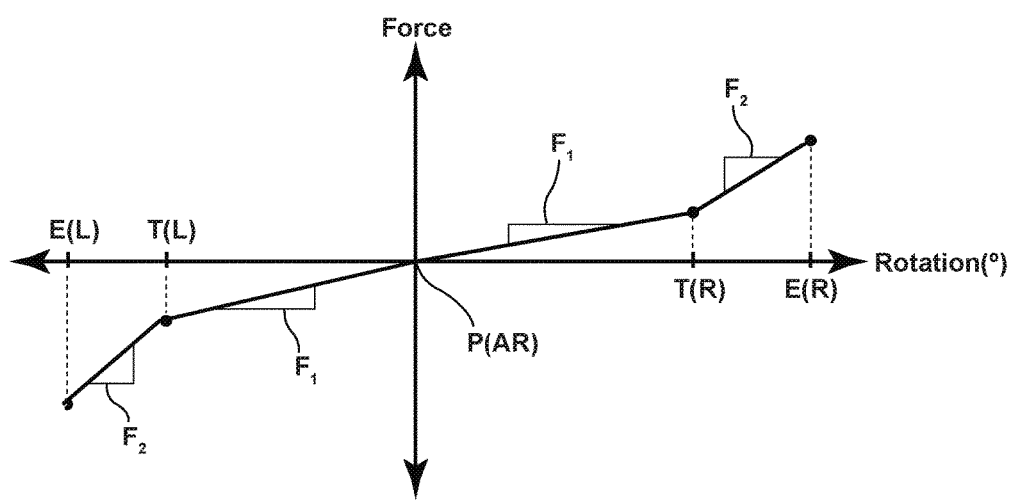
FIG. 13 is a graphical representation of a dual-rate biasing applied to the knob of FIGS. 10A and 10B during rotation thereof through various ranges.

FIG. 13 shows a graphical representation of the biasing characteristic of an input device according to the present disclosure, described above. As illustrated, the biasing torque (or torque in the case of a rotatable knob 30) increases at a first rate, represented by the slope $F_1$ of the depicted line during rotation in either direction from the at-rest position P(AR). Once the rotation reaches either threshold T(R) or T(L), the rate of increase in force (or torque) increases at a higher rate $F_2$ until the adjacent endpoint E(R) or E(L) is reached. As mentioned above, in an alternative embodiment, an abrupt increase in the force (or torque) may occur immediately at the thresholds T(R), T(L), followed by additional increase at rate $F_2$.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A steering input apparatus for a trailer backup assist system, comprising:
 a user-input control element:
  moveable away from a center position sequentially through a first range and a second range of directional positions; and
  biased toward the center position at a first rate through the first range and at a second, greater rate through the second range; and
 a controller generating a vehicle steering command based on an instantaneous position of the control element.

2. The steering input apparatus of claim 1, wherein the vehicle steering command is based on a curvature command corresponding to the instantaneous position of the control element, the curvature command increasing from a zero curvature to a calculated maximum curvature with movement of the control element from the center position through the first and second ranges of directional positions to an endpoint.

3. The steering input apparatus of claim 2, wherein the first range of directional positions corresponds to a first range of curvature commands below a predetermined threshold and the second range of directional positions corresponds to a second range of curvature commands above the predetermined threshold.

4. The steering input apparatus of claim 3, wherein the predetermined threshold is based on a calculated relationship between the first and second ranges of curvature commands and a turn recovery distance.

5. The steering input apparatus of claim 3, wherein the first and second ranges of directional positions are mapped to the first and second ranges of directional positions based on at least one known parameter of a vehicle-trailer combination associated with the steering input apparatus.

6. The steering input apparatus of claim 5, wherein the known parameter is at least one of a vehicle length and a drawbar length.

7. The steering input apparatus of claim 1, wherein the control module generates the vehicle steering command based on a curvature command corresponding to the instantaneous position of the control element and further calculates a curvature threshold corresponding to an end of the first range of directional positions based on a threshold recovery distance.

8. The steering input apparatus of claim 1, wherein the first rate and the second rate at which the control element is biased toward the center position are generally linear rates of increase in a biasing force applied to the control element.

9. The steering input apparatus of claim 1, wherein the control element is a rotatable knob, the first and second ranges of directional positions corresponding to rotation of the rotatable knob away from the center position.

10. The steering input apparatus of claim 1, wherein the first and second ranges of directional positions are on a first side of the center position, the control element being further moveable away from the center position sequentially through a third range and a fourth range of directional positions on a second side of the center position and biased toward the center position at the first rate through the third range and at the second rate through the fourth range.

11. A backup assist system for a vehicle reversing a trailer, comprising:
 a user-input control knob:
  rotatable away from a center position sequentially through a first range and a second range of directional positions; and
  biased toward the center position at a first rate through the first range and at a second, greater rate through the second range; and
 a controller generating a vehicle steering command based on an instantaneous position of the control knob.

12. The backup assist system of claim 11, wherein the control module generates the vehicle steering command based on a curvature command corresponding to the instantaneous position of the control knob and further calculates a curvature threshold corresponding to an end of the first range of directional positions based on a calculated threshold recovery distance.

13. The backup assist system of claim 11, wherein the first rate and the second rate at which the control knob is biased toward the center position are generally linear rates of increase in a biasing force applied to the control knob.

14. The backup assist system of claim 11, wherein the first and second ranges of directional positions are on a first side of the center position, the control knob being further rotatable away from the center position sequentially through a third range and a fourth range of directional positions on a second side of the center position and biased toward the center position at the first rate through the third range and at the second rate through the fourth range.

15. The backup assist system of claim 11, wherein the second rate is twice the first rate.

16. A method for assisting in reversing a vehicle-trailer combination, comprising:
 determining a range of steerable curvature commands for the vehicle-trailer combination;
 estimating a range of recovery distances corresponding with the range of steerable curvature commands;
 separating the range of recovery distances respectively into first and second sub-ranges below and above a recovery period threshold; and
 respectively allocating the first and second sub-ranges to first and second ranges of sequential movement of a user-input control element, wherein the control element is moveable away from a center position sequentially through the first range and the second range of sequential movement and is biased toward the center position at a first rate through the first range and at a second, greater rate through the second range.

17. The method of claim 16, wherein the recovery period threshold is a distance of about three vehicle lengths.

18. The method of claim 16, further including:
 generating a vehicle steering command based on a curvature command corresponding to an instantaneous position of the control element.

19. The method of claim 16, wherein respectively allocating the first and second sub-ranges to first and second ranges of sequential movement of the control element is such that:
 when the instantaneous position of the control element is within the first range, the curvature command corresponds to an instantaneous recovery distance below the recovery threshold; and
 when the instantaneous position of the control element is within the second range, the curvature command corresponds to an instantaneous recovery distance above the recovery period threshold.

20. The method of claim 16, wherein the first range of sequential movement is through about 75% of a total range of motion of the control element through both the first range and the second range.

* * * * *